Oct. 25, 1966  A. C. BOGDANOVICH  3,281,106
BINOCULAR MOUNT
Filed March 10, 1965

INVENTOR.
ANDREW C. BOGDANOVICH
BY
Lippincott, Ralls & Hendrickson
ATTORNEYS

United States Patent Office 3,281,106
Patented Oct. 25, 1966

3,281,106
BINOCULAR MOUNT
Andrew C. Bogdanovich, 580 Dentro Drive,
Santa Barbara, Calif.
Filed Mar. 10, 1965, Ser. No. 438,483
5 Claims. (Cl. 248—314)

The present invention relates in general to means for mounting and retaining binoculars in position for immediate use, and is particularly adapted for utilization upon vessels wherein pitching or rolling of the vessel may tend to unseat binoculars from conventional containers.

It is recognized that binoculars are a necessary instrument or device on the bridge of a ship, or the like, and, commonly, binoculars are kept immediately at hand by those sailing or otherwise operating ships of all sizes. Although it is possible for binoculars to be worn about the neck of the user by employing a strap on the binoculars, it is more convenient for binoculars to be safely positioned on a bulkhead, or the like, within ready reach. Because of the known propensities of vessels to pitch and roll, it is necessary to provide some type of means for retaining binoculars when not actually carried in the hand, and to this end there is commonly provided a closed box. Such a box, or the like, is usually padded inside to prevent the binoculars from undue jarring against the sides with the ships's motions, and is provided with a latching cover so that the binoculars cannot be inadvertently thrown from the receptacle or box during violent ship motions. Although this type of binocular retention prevents binocular damage, it also limits the availability of the binoculars, for, clearly, it is necessary that the one desiring to use them must unlatch the receptacle, raise the lid, and reach in and grasp the binoculars to remove them for use. Additionally, it is also possible for the binoculars to receive a considerable amount of buffeting within the box or receptacle, which can only be limitedly decreased by cushioning therein.

The present invention provides an open receptacle adapted to receive binoculars and retain them in position for immediate removal. The binocular holder of the present invention does not have a top nor any type of latch, so that one desiring to use binoculars disposed therein may instantly withdraw the binoculars for immediate use. Additionally, the present indvention provides for full retention of the binoculars without danger of their falling from the receptacle or holder even during violent ship motions. The binoculars are also prevented from any type of movement within the holder, so that they cannot be jarred by striking portions of the holder.

The present invention employs the pivotal motion of conventional binoculars for maintaining them within the holder thereof. In brief, the invention comprises an open-topped receptacle having a central member against which the two binocular telescopes are pressed by pivoting same inwardly, whereby the binoculars actually grasp the receptacle. The invention is best understood from consideration of the description and illustration of a single, preferred embodiment. It is not intended, however, to limit the present invention to the precise terms of the description or details of the illustration, and, instead, reference is made to the appended claims for a precise delineation of the true scope of this invention.

A single embodiment of this invention is illustrated in the accompanying drawings, wherein.

Figure 2:
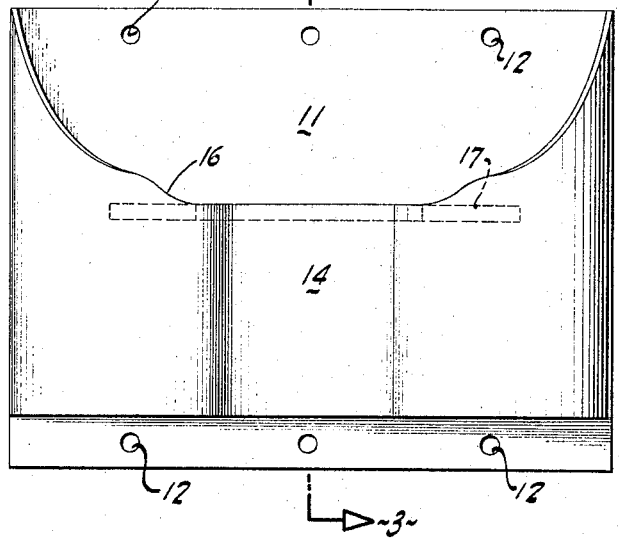
FIGURE 2 is a front elevational view of the binocular holder.
Figure 3:
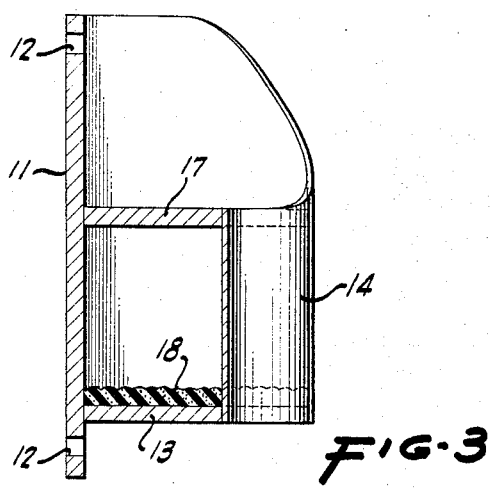
FIGURE 3 is a transverse elevational view in section taken in the plane 3—3 of FIGURE 2.

Considering now the illustrated embodiment of the present invention and referring to the drawings, it will be seen that there is provided a vertical back plate or wall 11 which may be provided with a plurality of apertures 12 therethrough as along the top and bottom thereof, in order to accommodate the passage of mounting means such as screws, or the like, for securing the binocular holder upon a bulkhead of a ship. Extending from the front of the vertical plate 11 above the bottom thereof is a floor 13 upon which binoculars are adapted to rest, as described in more detail below. A front wall 14 extends about the floor 13 from opposite ends of the rear plate 11 to thereby define an enclosure which is open at the top. This front wall or cover 14 extends upwardly from the floor only a minimum distance at the center thereof, and may have a curved depression 16 therein, as illustrated in FIGURE 2. A central clamping plate 17 extends outwardly from the front of the rear plate 11 above the floor 13 to the front wall 14. This clamping plate 17 is laterally positioned at the center of the rear plate 11 and front wall 14, as illustrated.

Figure 1:
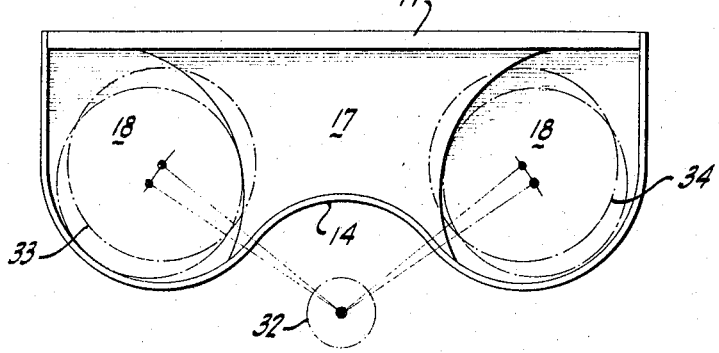
FIGURE 1 is a plan view of the binocular holder of this invention.

Although a variety of different physical configurations of the above-described elements are possible, the preferred embodiment of the invention illustrated has the floor 13 formed with a pair of outwardly curved portions connected by a central curved indentation, as best seen in FIGURE 1. The front wall 14 extends from the lateral edges of the back plate 11 about these curves of the floor, so as to define a pair of spaced generally cylindrical volumes separated by the central clamping plate 17. This clamping plate which is secured to both the rear plate 11 and front wall 14 has the sides thereof curved on generally the same radius of curvature as the front wall, to thus further define the circular outline of the cylindrical volumes noted above. In this manner, there is provided two spaced cylindrical volumes for receiving individual barrels of a pair of binoculars. Additionally, the front wall may be curved downwardly from the rear plate edges, somewhat in the manner illustrated in FIGURE 2, and from this curvature may extend inwardly in a general horizontal direction along the top edge of the front wall to the central curved depression 16. This configuration provides a pleasing visual effect to the binocular holder, while providing access to the upper apertures 12 on the back plate, and also providing for maximum access to binoculars mounted within the holder, as noted below.

The binocular holder of the present invention may be formed of a wide variety of materials, such as metal, plastic, wood, etc., and of course, all described elements of the holder are joined together as by gluing in the case of wood construction, or by molding any single integral unit in the case of plastic structures. Formation of the binocular holder from a wood, such as mahogany, or the like, may be accomplished to match mahogany bulkheads of sailing vessels, for example, and in such an instance the front wall 14 may be formed of a thin veneer which is relatively easily curved in the manner illustrated and described.

The binocular holder described above and illustrated in the accompanying drawings, is adapted to receive a pair of binoculars with the separate barrels thereof inserted in the generally cylindrical volumes at each end. The binoculars are placed in the holder from the top thereof with the front or large end of the binoculars downward. In order to prevent possible scratching of the binocular lenses, a soft and preferably resilient covering 18 is provided upon the upper surface of the floor 13. This covering may, for example, comprise a thin sheet of foam rubber.

Figure 4:
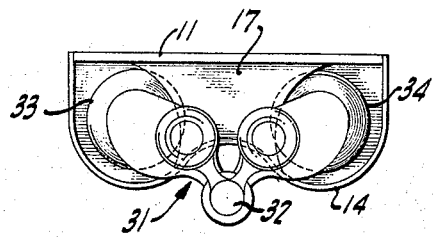
FIGURE 4 is a representation of the binocular holder of the present invention containing binoculars.

Considering further the actual utilization of the binocular holder invention, it is first assumed that the holder is mounted upon a vertical surface such as the bulkhead of a ship. Normally, the holder would be mounted on the bridge, or the like, of a ship having a bridge, or possibly adjacent the helm of a small sailing vessel. Mounting of the holder is accomplished by fastening means inserted through the apertures 12 in the back plate 11, and on a wooden bulkhead screws are quite suitable for such fastening means. The holder is mounted in the position illustrated in FIGURE 2, with the open top upward. Binoculars 31 are inserted in the holder by lowering the binoculars into the open top of the holder with one barrel of the binoculars in each of the openings on opposite sides of the central plate 17. The central depression 16 in the front wall 14 accommodates the central supporting pivot shaft 32 of the binoculars, upon which the two barrels 33 and 34 are mounted. After the binoculars are fully lowered into the holder, the barrels are pivoted about the shaft 32 toward each other until both firmly engage the curved central plate 17 on opposite sides thereof. In this position, as shown in FIGURE 4, the binoculars firmly grip the central plate of the holder and are consequently held within the holder. It is further noted that binocular barrels normally decrease in diameter toward the rear or eyepiece end, so that following vertical insertion of the binoculars into the holder and pivoting of the two barrels of the binoculars together, some portion of each of the barrels will acually underlie the central plate 17. This then provides an even firmer engagement of binoculars in the holder, for it is clearly impossible to raise the binoculars from the holder without physically pivoting the binocular barrels apart, and a mere upward pull upon the binoculars wll not serve to slide them from the holder.

It will be seen that the binocular holder of the present invention provides for the secure mounting of binoculars and retention of them, despite rather violent movements of the bulkhead, or the like, upon which the binocular holder is secured. Severe rolling of a ship will only pivot the binocular holder mounted thereon, and even drastic pitching of the ship would most rapidly raise and lower the binocular holder. In either case, the gripping engagement of binoculars and holder is quite adequate to maintain the binoculars within the holder. Furthermore, the clamping action of binocular barrels against the central plate 17 of the holder and the underlying relationship of portions of the binocular barrels to this central plate preclude any possible movement of the binoculars with respect to the holder. The curved sides of this central plate 17 provide for the binocular barrels being disposed as close together as possible while engaging the central plate, and thus any tendency of the binoculars to move forward or backward in the holder would require that the binocular barrels be moved outwardly with respect to each other. It is thus believed clear that no movement whatsoever occurs between binoculars and holder, once the binoculars are inserted in the holder and the binocular barrels are pivoted toward each other against the central clamping plate of the holder.

What is claimed is:

1. Binocular mounting means comprising means defining a pair of adjacent open-topped cylindrical compartments for accommodating separate binocular barrels and having a cushioned floor for receiving the large end of said binocular barrels, and a central clamping plate disposed between and separating said compartments for engagement by binocular barrels on opposite sides thereof for binocular retention.

2. A binocular holder comprising a back wall for mounting of the holder, a cushioned floor member extending from said wall, a front cover defining an open-topped chamber with said back wall and floor, and a central plate extending from said back wall to said front cover above said floor and defining a pair of binocular barrel receptacles, said central plate having a minimum width less than the maximum separation of binocular barrels.

3. A binocular holder as set forth in claim 2 further defined by said central plate having concavely curved side edges extending between back wall and front cover with the minimum plate width adjacent the center of the plate.

4. A binocular holder as set forth in claim 2 further defined by said front cover having a vertical depression at the middle thereof extending downwardly substantially to said central plate for accommodating a central binocular pivot shaft in extension out of the holder with binocular barrels pivoted against the central plate.

5. A binocular holder comprising a rear wall, a floor member extending from said wall near the bottom thereof and normal thereto, a curved front cover engaging the rear wall adjacent the ends thereof and having a pair of outward curved portions separated by a concave portion for defining an open-topped container of larger volume at each end, and a central plate extending between said rear wall and said front cover above said floor member at the concave portion of said front cover, said central plate having concave sides between said rear wall and front cover with a minimum plate width adjacent the middle of the plate, said front cover having a height along the outwardly curved portions less than the length of binocular barrels and a decreased height along the concave portion for accommodating a binocular pivot shaft extending in front of the holder with binocular barrels inserted and pivoted together against said central plate.

References Cited by the Examiner

UNITED STATES PATENTS

| D. 161,850 | 2/1951 | Maier | 57—1 |
| 2,203,402 | 6/1940 | Bausch | 206—6 |
| 2,845,245 | 7/1958 | Gray et al. | 248—314 |

CLAUDE A. LE ROY, *Primary Examiner.*

J. F. FOSS, *Assistant Examiner.*